O. C. GREEN.
Wheel-Harrow.

No. 26,179.  Patented Nov. 22, 1859.

Witnesses.
James H. Gridley
Jno. H. Clute

Inventor.
O. C. Green
Knight Brothers
Attys.

UNITED STATES PATENT OFFICE.

OLIVER C. GREEN, OF DUBLIN, INDIANA.

IMPROVEMENT IN HARROWS.

Specification forming part of Letters Patent No. 26,179, dated November 22, 1859.

*To all whom it may concern:*

Be it known that I, OLIVER C. GREEN, of Dublin, Wayne county, Indiana, have invented a new and useful Improvement in Harrows; and I do hereby declare the following to be a full, clear, and exact description of the same, reference being had to the accompanying drawings, making part of this specification.

My invention consists in an arrangement for elevating the harrow on wheels and at the same time throwing the teeth backward to clear them of trash, and also to facilitate removing the implement from place to place.

Figure 1:
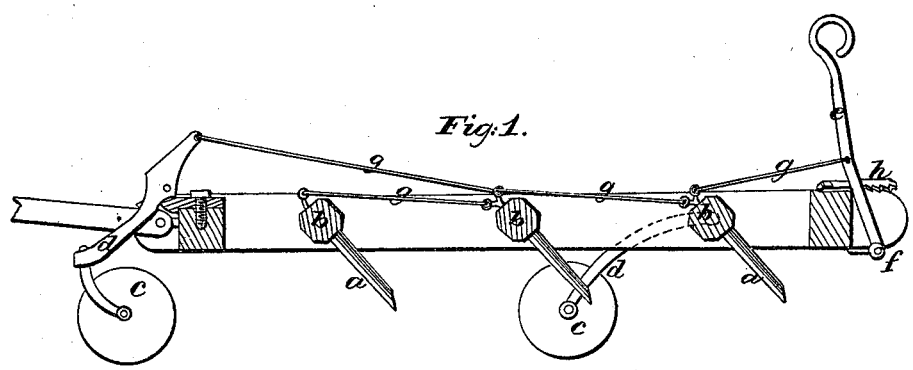
Figure 2:
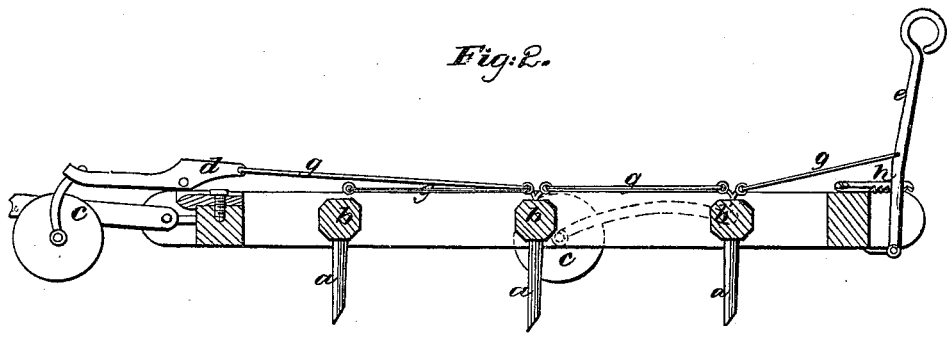

In the accompanying drawings, Figure 1 is a vertical longitudinal section of the harrow with the wheels depressed and the teeth thrown back. Fig. 2 is a similar view with the wheels elevated and the teeth in action.

$a\ a\ a$ are harrow-teeth fixed in horizontal beams $b\ b\ b$, running crosswise of the harrow and journaled at the ends, so as to allow them a rocking motion.

$c\ c$ are wheels running on arms $d\ d$, which are hinged to the frame of the machine.

$e$ is a handle or lever, hinged at $f$, and communicating by means of rods $g$ with the tops of the tooth-beams, and also with the upper ends of the arms $d$ on which the wheels run.

$h$ is a rack adapted to hold the handle in any desired position.

The operation is as follows: When harrowing is to be performed the lever $e$ is drawn back into the position shown in Fig. 2, and there confined by rack $h$ holding the teeth firmly in vertical position, and the wheels elevated either entirely off the ground or so as to limit the depth of working of the teeth. If it is desired to free the teeth from accumulated trash, or to allow the machine to pass over obstructions, the lever $e$ is released, so as to enable the force of the team to incline the teeth backward, and also at the same time to depress the wheels, and thereby to elevate the machine from the ground, the two actions resulting in the instantaneous clearing of the teeth, and in case of any strong obstruction—such as a root or stump—the teeth are so elevated and inclined backward as to pass safely over. This condition of the machine also enables it to be conveyed from place to place, for which purpose the lever is fixed in its foremost position by means of a suitably-shaped tooth in the front part of the rack $h$.

I claim as new and of my invention herein and desire to secure by Letters Patent—

The described arrangement of the harrow-teeth $a$, beams $b$, wheels $c$, arms $d$, lever $e$, rods $g$, and rack $h$, the whole being constructed and operating together in the manner and for the purposes set forth.

In testimony of which invention I hereunto set my hand.

OLIVER C. GREEN.

Witnesses:
JOSEPH C. HAINES,
J. A. LACKEY.